United States Patent [19]
Boland et al.

[11] 3,936,186
[45] Feb. 3, 1976

[54] APPARATUS FOR EXPOSING DIAZO PRINTING PLATES AND THE LIKE

[75] Inventors: Steven H. Boland, Arcadia; Stephen Olah, Sierra Madre, both of Calif.

[73] Assignee: Ultra-Violet Products, Inc., San Gabriel, Calif.

[22] Filed: July 25, 1974

[21] Appl. No.: 491,688

[52] U.S. Cl. .............. 355/83; 355/68; 355/70; 355/85
[51] Int. Cl.² ........................................ G03B 27/78
[58] Field of Search ......... 355/115, 113, 91, 93, 94, 355/83, 68, 69, 70, 37, 120, 85

[56] References Cited
UNITED STATES PATENTS

| | | | |
|---|---|---|---|
| 3,479,119 | 11/1969 | Miller et al. | 355/68 X |
| 3,619,601 | 11/1971 | Gush et al. | 355/121 X |
| 3,627,416 | 12/1971 | Benson | 355/91 X |
| 3,715,160 | 2/1973 | Fader et al. | 355/115 X |
| 3,732,461 | 5/1973 | Bickl et al. | 355/70 X |

*Primary Examiner*—Richard L. Moses
*Attorney, Agent, or Firm*—Harris, Kern, Wallen & Tinsley

[57] ABSTRACT

Apparatus for graphic arts plate making suitable for exposing diazo plates and the like. A unit providing an exposure bed with a plurality of lamps close to the negative and plate and operating in the ultraviolet region, and another plurality of lamps in the visible light region with a diffused glass top for a work table and for fixing an exposed plate. Separate control units for each exposure lamp to provide uniform radiation from all lamps to the plate.

13 Claims, 4 Drawing Figures

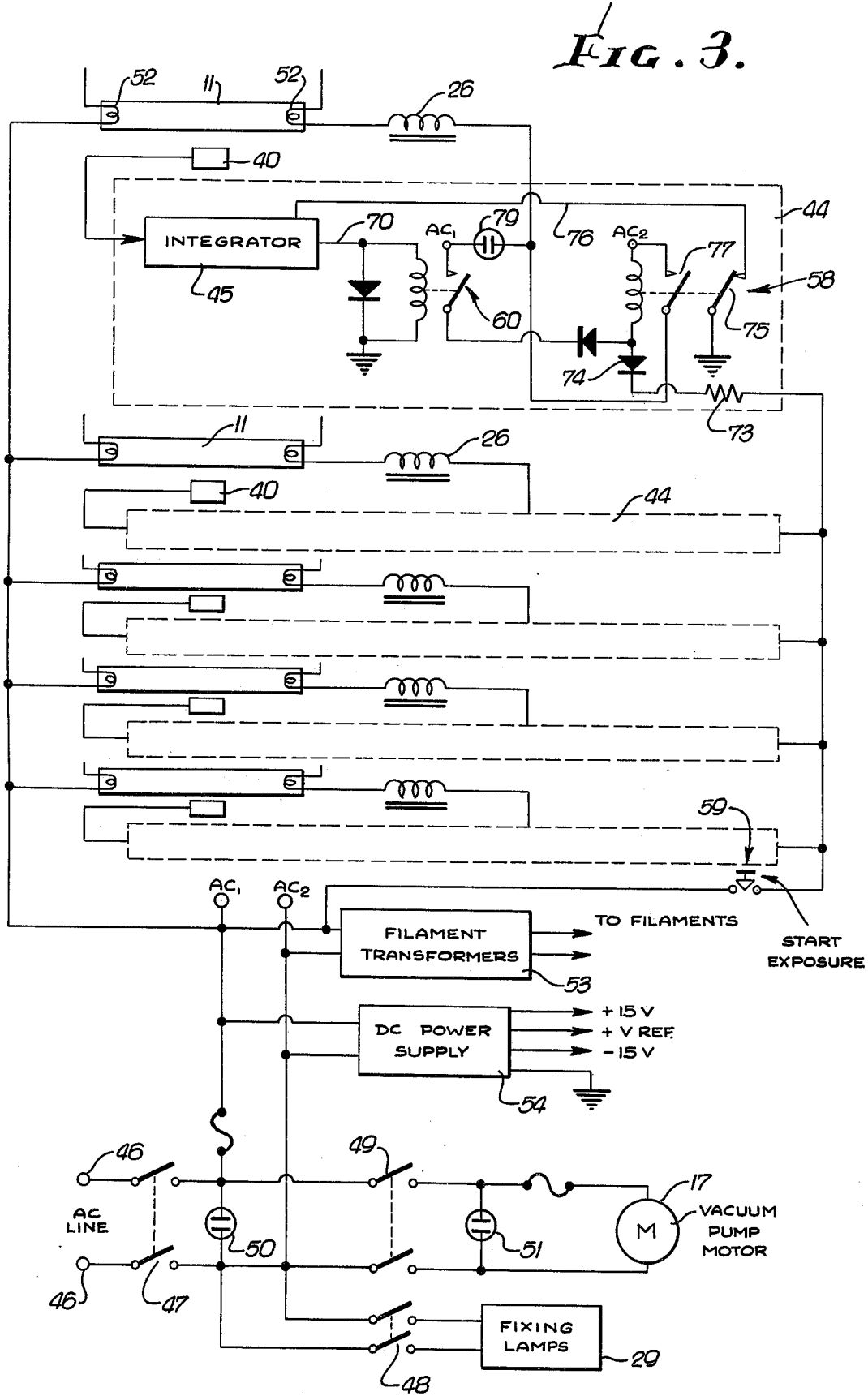

APPARATUS FOR EXPOSING DIAZO PRINTING PLATES AND THE LIKE

This invention relates to apparatus for exposing photosensitive material, such as diazo printing plates used in the graphic arts field. In a typical prior art apparatus, the photosensitive plate and the negative are placed on a support and exposed to a high intensity source such as a carbon arc for a period of time sufficient to obtain the desired result. A typical graphic arts plate may be 24 × 36 inches and be exposed by a 5000 watt arc lamp positioned 3 feet from the plate. Even with this remote positioning, uniformity of exposure is difficult to obtain, with the exposure at the edge of a plate varying as much as 50% of the exposure at the center.

It is an object of the present invention to provide a new and improved exposure unit which will provide a substantially uniform exposure over the entire surface of a printing plate, while utilizing considerably less power and achieving the desired exposure in a shorter time. A further object is to provide such a unit which will produce plates with a minimum of undercut and which will have superior press life.

A further object is to provide such a unit having a first set of lamps for exposure and second set of lamps for fixing, permitting the exposure and fixing steps to be carried out at one work station and in a short period of time. A further object is to provide such a unit which can be made in a relatively small volume and which can be operated at table heights, with the fixing table also serving as a light table.

By way of summary, the apparatus of the invention includes a plurality of tubular lamps positioned in parallel spaced relation with individual reflectors and a bed for supporting the photosensitive plate and negative close to the lamps. Separate radiation control circuits are provided for each lamp permitting all lamps to be turned on at the same time at the start of an exposure, with each lamp being turned off separately. Further, a second set of lamps is mounted above the first set beneath a diffused glass plate to provide the fixing radiation and also to serve as a work table.

Other objects, advantages, features and results will more fully appear in the course of the following description. The drawings merely show and the description merely describes a preferred embodiment of the present invention which is given by way of illustration or example.

In the drawings:

FIG. 3 is an electrical schematic of the apparatus of FIG. 1; and

Figure 1:
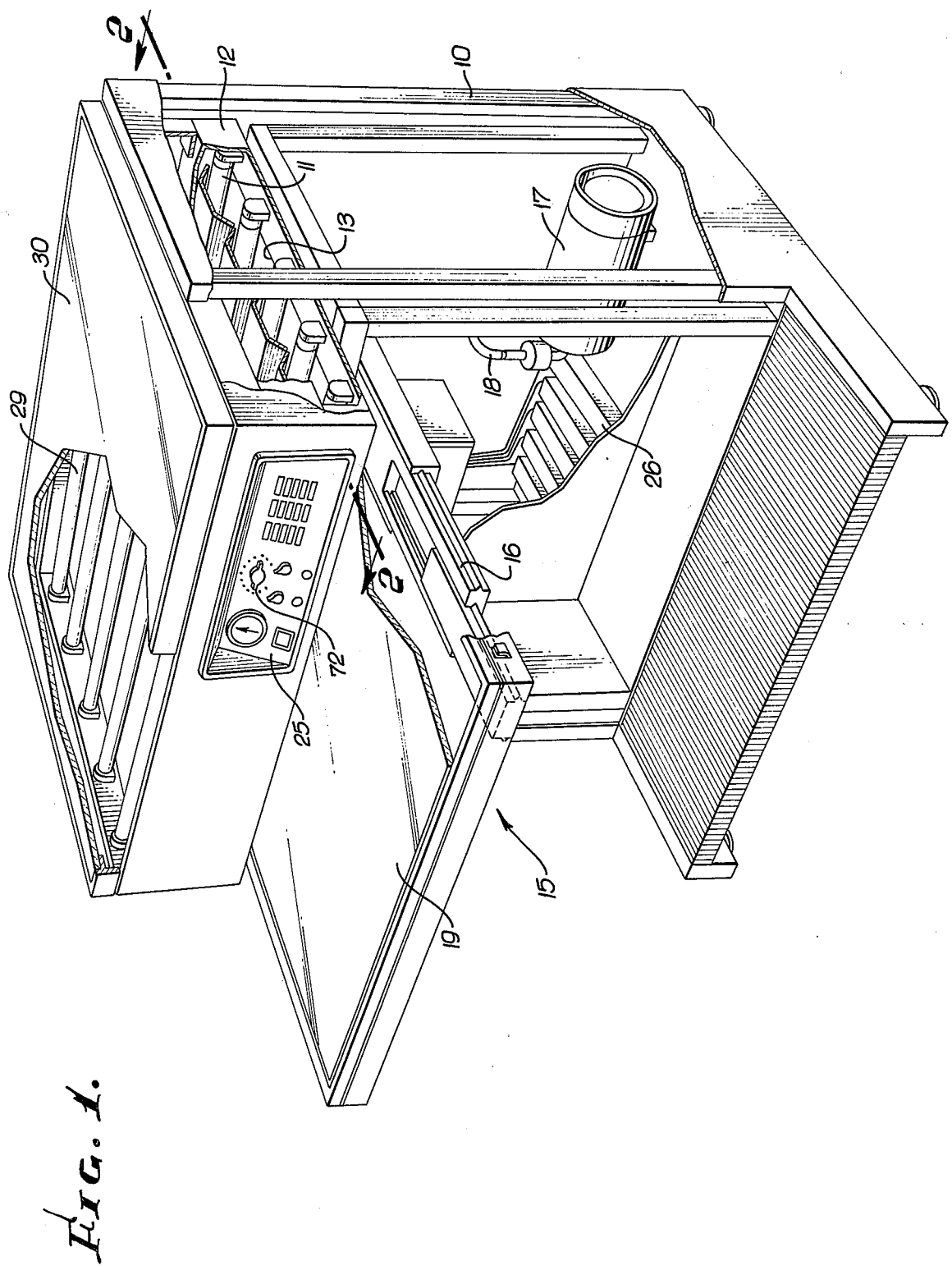
FIG. 1 is a perspective view of a plate exposing apparatus incorporating the presently preferred embodiment of the invention.

The apparatus of FIG. 1 includes a frame or housing 10 which is designed to stand on the floor and be about table height. Some of the side panels are broken away in FIG. 1 to show the interior of the device. A plurality of lamps 11 is mounted in an enclosure 12 with an opening 13 below the lamps.

Figure 2:
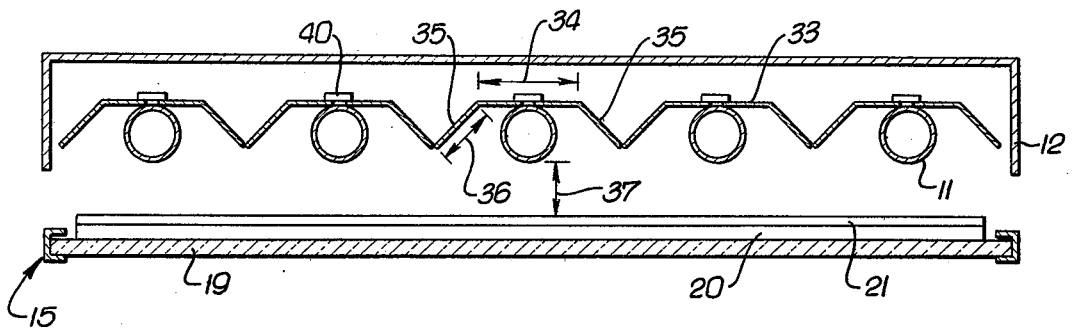
FIG. 2 is an enlarged sectional view taken along the line 2—2 of FIG. 1 showing the exposing lamps and reflectors.
Figure 4:
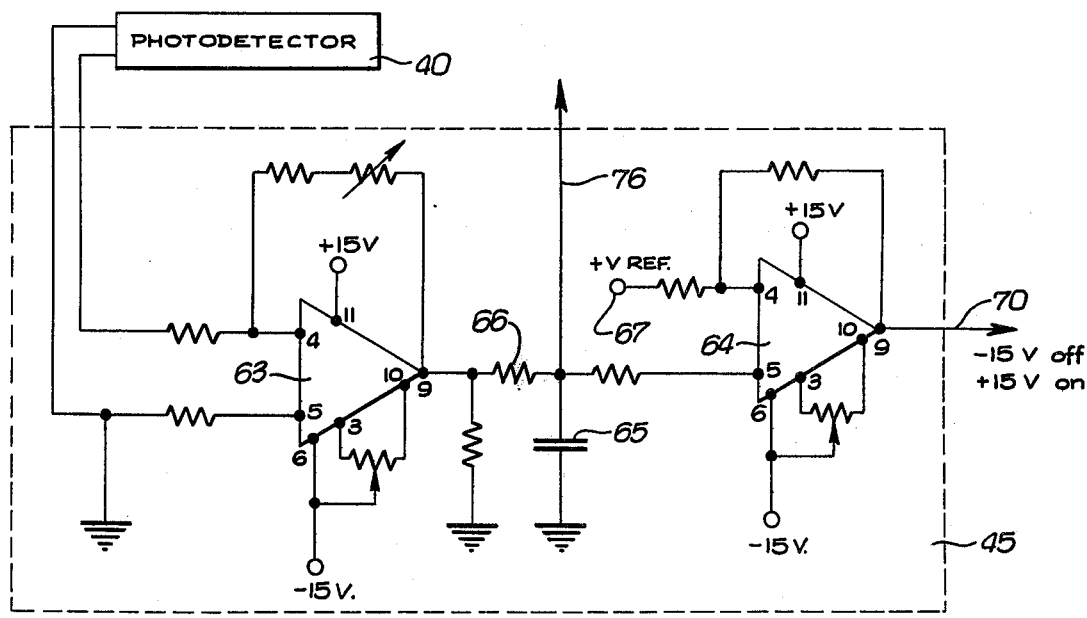
FIG. 4 is an electrical schematic of the integrator of FIG. 3.

A vacuum frame 15 is mounted in the housing 10 on a slide mechanism 16 and is shown in the partially extended position in FIG. 1. The frame 15 includes a bed 19 for supporting a photosensitive plate and a negative below the lamps 11 when the frame 15 is in the in or exposing position as shown in FIG. 2. A motor driven vacuum pump 17 is mounted withing the housing 10 and is connected to the vacuum frame 15 via a line 18. The vacuum frame operates in the normal manner to hold a photosensitive sheet 20 and a negative 21 flat on the bed 19 when the vacuum pump is turned on.

The control switches and indicator lights for the instrument are mounted in a panel 25 with the control circuit components in the housing behind the panel and with the lamp ballasts 26 mounted on the floor of the housing 10.

Another plurality of lamps 29 is mounted in the housing 10 below a diffused glass bed plate 30. Both sets of lamps 11 and 29 are positioned in parallel spaced relation to provide a substantially uniform radiation distribution over the surface of the beds 19 and 30, respectively. The lamps 11 are utilized as exposing lamps and the lamps 29 are utilized as fixing lamps. The lamps 29 and plate 30 also provide a light table for use in negative preparation.

A separate reflector 33 is provided for each lamp 11 for the purpose of achieving a substantially uniform radiation distribution over the entire work surface. A preferred configuration for the reflectors is shown in FIG. 2. The reflectors 33 are trough shaped and are positioned side by side with their edges in contact or nearly so. The reflector trough has a flat bottom with a width 34 substantially equal to two times the diameter of the lamp 11. The trough sides 35 are positioned at 45° to the bottom and are of a length 36 substantially equal to 0.84 times the diameter of the lamp 11. The lamp is positioned in the center of the reflector touching or nearly touching the bottom, with the center to center spacing of adjacent lamps substantially equal to 3½ times the lamp diameter. The spacing 37 between the lamp and the work piece is relatively small, typically being in the order of a lamp diameter. While five lamps are illustrated in the drawings, it is readily understood that the apparatus is not limited to this particular number of lamps and fewer or more may be utilized depending upon the size of photosensitive sheet to be exposed.

The unit includes a separate control for each of the exposing lamps 11 for the purpose of obtaining the same exposure from each lamp during an exposing operation. A photosensitive detector 40 is mounted on the reflector adjacent the lamp. In operation, all the exposing lamps are turned on at the same time. The output of each photo detector is connected to an integrator of a control circuit which functions to turn off the power to the individual lamp when the integrator output reaches a predetermined level. The various lamps may be turned off at the same time or at different times, depending upon the radiation outputs from the respective lamps. With this arrangement, a uniform exposure is obtained over the entire work piece without requiring matching of individual lamps.

Referring to FIG. 3, a control circuit 44 with an integrator 45 is provided for each of the lamps 11. Power is supplied to the unit at input terminals 46 and is controlled by the main on-off switch 47. The fixing lamps 29 are controlled by another switch 48 and the vacuum pump motor 17 is controlled by a switch 49. A lamp 50 indicates when the switch 47 is closed and another lamp 51 indicates when the switch 49 is closed. The filament windings 52 for the lamps are energized from filament transformers 53, and dc voltages for the integrators 45 are provided by a power supply 54. The reference voltage output from the power supply 54 is adjustable and functions to set the duration of the exposure.

Each of the control circuits 44 has a relay 58 controlled by start push button switch 59, and another relay 60 controlled by the integrator 45.

The integrator 45 includes amplifiers 63, 64, each of which may be a 741 integrated circuit. The photodetector 40 is connected as an input to the amplifier 63, with the output thereof charging storage capacitor 65 through resistor 66. Amplifier 64 functions as a comparator, having the reference voltage as one input at terminal 67 and having the voltage on the capacitor 65 as the other input. In the embodiment illustrated, the output of the comparator on line 70 switches between plus 15 volts and minus 15 volts, energizing the relay 60 to turn the lamp 11 on when the output is plus and leaving the relay unenergized turning the lamp off when the output is minus.

In operation, the switch 47 is closed to provide power to the filaments and the dc power supply. The bed 15 is pulled out, the photosensitive sheet and the negative are placed on the bed, and switch 49 is closed to start the vacuum pump. When the sheet and negative are held secure and flat, the bed may be pushed into the exposing position. The desired exposure is set by adjusting the reference voltage output of the power supply, as by turning the knob 72 to the appropriate indication. An exposure is started by pressing the start button 59 which energizes the latching relays 58 of the control circuits through resistor 73 and diodes 74.

When the relay 58 is energized, contact set 75 is opened removing the ground connection via line 76 from the capacitor 65. Contact set 77 is closed providing ac power to the lamps. The integrator 45 now provides a plus output which energizes the relay 60 and applies a holding current to the relay 58 through the contact set of the relay 60. A light 79 is energized indicating that the corresponding lamp 11 is turned on.

With the exposing lamp on, the corresponding photodetector provides an input to the amplifier 63 which charges the capacitor 65. When the charge on the capacitor rises to a level determined by the reference voltage setting, the comparator output changes from plus to minus, the relay 60 is deenergized which in turn deenergizes the relay 58 and power is removed from the lamp 11. When all the exposing lamps are turned off, as indicated by all of the lights 79 being off, the bed 15 is pulled to the out position, the vacuum pump motor is turned off, and the negative and exposed sheet are removed. The exposed sheet may be placed face downward on the bed 30 and the fixing lamps turned on.

The apparatus of the present invention provides a substantially uniform exposure over the entire surface of the plate. The exposure from edge to edge is within the range of plus and minus 5% as compared to a variation in the order of 50% for prior art apparatus. The configuration of the present apparatus permits much closer spacing between the lamp and the plate with a resultant reduction in required exposure time and required output from the radiation source.

The present apparatus provides both for exposing and fixing in a single piece of equipment. Also it provides the desired spectral range for the exposing and for the fixing. In many present day papers and plates, the wavelength for fixing is different from the wavelength for exposing; also, it is desirable to have the exposing radiation have little or no energy in the fixing range. This can be achieved with the instrument described herein by utilizing lamps with a narrow band spectral output as exposing lamps and utilizing different lamps for the fixing lamps. In one configuration, ultraviolet lamps are used for the exposing lamps and visible light lamps are used for the fixing lamps. In a particular embodiment, lamps having a narrow band spectral output at the 365 nanometer wavelength region are used as exposing lamps and lamps having a spectral output at the 435 nanometer wavelength region are used as fixing lamps, these lamps being particularly suited for present day papers. The use of fixing lamps with a visible light output also permits use of the instrument as a light table. The fixing lamps should have little output below about 420 nanometers wavelength in order to avoid further exposure of the photosensitive plate.

A lamp with a narrow band spectral output will provide an output over about 100 nanometers. Hence a narrow band lamp with a peak at 365 nanometers will produce radiation in the range of about 315 to 415 nanometers wavelength. This is in contrast to the wide band spectral output of carbon arcs and Xenon and tungsten lamps which provide outputs over a spectral range in the order of 200 to 2,000 nanometers wavelength.

The utilization of the plurality of exposing lamps with the individual reflectors, particularly with the reflector configuration and lamp-to-work piece spacing described, results in a reduction in undercutting which permits improvement in resolution. Resolutions in the order of 250 lines per inch are obtained with the instrument of the present invention before undercut becomes a problem. Undercut is where the dot patterns used in lithographic printing becomes enlarged or reduced from the normal size on the film negative.

The instrument of the invention was operated with parabolic reflectors and with hyperbolic reflectors in place of the straight side reflectors disclosed herein. The curved reflectors had the same depth and the same opening width as the straight side reflectors, but undercut became a problem at resolutions of about 100 lines per inch.

We claim:
1. Apparatus for exposing diazo printing plates and the like, including in combination:
   a frame;
   a first plurality of tubular lamps mounted in said frame in spaced parallel relation for imagewise exposing a radiation sensitive sheet;
   a bed mounted in said frame for supporting sheet parallel to the plane of said lamp;
   a plurality of radiation sensors, with a sensor mounted adjacent each lamp;
   a plurality of control circuits, with a circuit for each lamp,
   each of said control circuits including means for energizing the associated lamp in response to a start signal and deenergizing the lamp when the lamp has provided a predetermined quantity of radiation as measured by the corresponding sensor;
   a second plurality of tubular lamps mounted in said frame in spaced parallel relation for fixing the pre- viously exposed image on said sheet; and a second bed mounted in said frame for supporting sheet parallel to the plane of said second lamps and for allowing exposure of said sheet to radiation from the second lamps.

2. Apparatus as defined in claim 1 wherein said first plurality of lamps are positioned uniformly across said bed and spaced not more than a few inches from the bed.

3. Apparatus as defined in claim 1 wherein said first plurality of lamps have a narrow band spectral output.

4. Apparatus as defined in claim 1 wherein said second bed is positioned above said second lamps and provides for radiation transmission therethrough to a sheet resting on the second bed.

5. Apparatus as defined in claim 1 wherein said first lamps have a narrow band spectral output in the ultraviolet region and said second lamps have a spectral output in the visible light region.

6. Apparatus as defined in claim 1 wherein said first lamps have a narrow band spectral output in the 365 nanometer wavelength region and said second lamps have a spectral output in the 435 nanometer wavelength region.

7. Apparatus for exposing diazo printing plates and the like, including in combination:
a frame;
a first plurality of tubular lamps mounted in said frame in spaced parallel relation for imagewise exposing a radiation sensitive sheet;
a first bed mounted in said frame for supporting sheet parallel to the plane of said lamps;
a plurality of reflectors positioned side by side, with a separate reflector for each lamp;
a second plurality of tubular lamps mounted in said frame in spaced parallel relation above said first lamps for fixing the previously exposed image on said sheet;
a second bed mounted in said frame for supporting said sheet above and parallel to the plane of said second lamps, said second bed providing for radiation transmission from the second lamps to the sheet; and
means blocking radiation from said first plurality of lamps to a sheet resting on said second bed.

8. Apparatus as defined in claim 7 including slide means for sliding said first bed from an exposure position below said first lamps to a loading and unloading position at the side of said first lamps.

9. Apparatus as defined in claim 7 wherein said first lamps have a narrow band spectral output in the ultraviolet region and said second lamps have a spectral output in the visible light region.

10. Apparatus for exposing diazo printing plates and the like, including in combination:
a frame;
a plurality of tubular lamps mounted in said frame in spaced parallel relation for imagewise exposing a radiation sensitive sheet;
a bed mounted in said frame for supporting sheet parallel to the plane of said lamp;
a plurality of radiation sensors, with a sensor mounted adjacent each lamp; and
a plurality of control circuits, with a circuit for each lamp,
each of said control circuits including means for energizing the associated lamp in response to a start signal and deenergizing the lamp when the lamp has provided a predetermined quantity of radiation as measured by the corresponding sensor,
each of said control circuits including an integrator having the output of the corresponding sensor connected as an input, and providing a stop signal to shut off power to the associated lamp when the integrator output reaches a predetermined value, and
a comparator in the control circuit having the integrator output and a reference value as inputs, with the comparator output providing the stop signal.

11. Apparatus for exposing diazo printing plates and the like, including in combination:
a frame;
a plurality of tubular lamps mounted in said frame in spaced parallel relation for imagewise exposing a radiation sensitive sheet;
a plurality of reflectors positioned side by side, with a separate reflector for each lamp;
a bed mounted in said frame for supporting sheet parallel to the plane of said lamp;
a plurality of radiation sensors, with a sensor mounted adjacent each lamp; and
a plurality of control circuits, with a circuit for each lamp,
each of said control circuits including means for energizing the associated lamp in response to a start signal and deenergizing the lamp when the lamp has provided a predetermined quantity of radiation as measured by the corresponding sensor.

12. Apparatus as defined in claim 11 with the center to center spacing of said lamps substantially equal to 3½ times the lamp diameter, and with each of said reflectors trough shaped with a flat bottom of a width substantially equal to 2 times the lamp diameter and sides at substantially 45° and of a length substantially equal to 0.84 times the lamp diameter, with the lamp positioned at the center of the trough.

13. Apparatus for exposing diazo printing plates and the like, including in combination:
a frame;
a plurality of tubular lamps mounted in said frame in spaced parallel relation, said lamps having a narrow band spectral output at the 365 nanometer wave length region for imagewise exposing a radiation sensitive sheet;
a bed mounted in said frame for supporting sensitive sheet parallel to the plane of said lamp;
a plurality of radiation sensors, with a sensor mounted adjacent each lamp; and
a plurality of control circuits, with a circuit for each lamp,
each of said control circuits including means for energizing the associated lamp in response to a start signal and deenergizing the lamp when the lamp has provided a predetermined quantity of radiation as measured by the corresponding sensor.

* * * * *

UNITED STATES PATENT AND TRADEMARK OFFICE
CERTIFICATE OF CORRECTION

PATENT NO. : 3,936,186
DATED : February 3, 1976
INVENTOR(S) : Steven H. Boland and Stephen Olah It is certified that error appears in the above-identified patent and that said Letters Patent are hereby corrected as shown below:

Column 4, line 56; Column 5, line 32; Column 5, line 61; and Column 6, line 26; before "sheet" insert --said--

Column 6, line 53, before "sheet" delete --sensitive-- insert --said--

Signed and Sealed this

Sixth Day of July 1976

[SEAL]

Attest:

RUTH C. MASON
Attesting Officer

C. MARSHALL DANN
Commissioner of Patents and Trademarks